(12) United States Patent
Erdem et al.

(10) Patent No.: US 12,036,658 B2
(45) Date of Patent: Jul. 16, 2024

(54) DEVICE FOR SUPPORTING A LOAD

(71) Applicant: ROPHI AB, Västra Frölunda (SE)

(72) Inventors: Ilker Erdem, Gothenburg (SE); Hossein Abadikhah, Västra Frölunda (SE)

(73) Assignee: TRICYLON ROBOTIC AB, Gothenburg (SE)

( * ) Notice: Subject to any disclaimer, the term of this patent is extended or adjusted under 35 U.S.C. 154(b) by 301 days.

(21) Appl. No.: 17/763,128

(22) PCT Filed: Oct. 5, 2020

(86) PCT No.: PCT/SE2020/050939
§ 371 (c)(1),
(2) Date: Mar. 23, 2022

(87) PCT Pub. No.: WO2021/071407
PCT Pub. Date: Apr. 15, 2021

(65) Prior Publication Data
US 2022/0347832 A1    Nov. 3, 2022

(30) Foreign Application Priority Data
Oct. 7, 2019  (SE) .................................... 1900163-5

(51) Int. Cl.
*B25H 1/10*    (2006.01)
*B25H 1/02*    (2006.01)
(Continued)

(52) U.S. Cl.
CPC .................. *B25H 1/10* (2013.01); *B25H 1/02* (2013.01); *F16M 11/2021* (2013.01); *F16M 11/32* (2013.01)

(58) Field of Classification Search
CPC .... F16M 11/2021; F16M 11/32; F16M 11/18; B25H 1/10; B25H 1/02; B25J 17/0266
See application file for complete search history.

(56) References Cited

U.S. PATENT DOCUMENTS

| 7,124,660 B2 * | 10/2006 | Chiang ............ G09B 9/02 901/16 |
| 2003/0106230 A1 * | 6/2003 | Hennessey ....... B25J 17/0216 33/645 |

(Continued)

FOREIGN PATENT DOCUMENTS

| CN | 107116536 | 9/2017 |
| CN | 108266615 | 7/2018 |

(Continued)

*Primary Examiner* — Lee D Wilson
(74) *Attorney, Agent, or Firm* — DUANE MORRIS LLP; Gregory M. Lefkowitz (57) ABSTRACT

The disclosure relates to a machine comprising; a fixed lower platform having a first connecting area; a movable upper platform having an operating area and a second connecting area; at least three limbs, each limb comprising a lower section, an upper section and an intermediate section between the lower section and the upper section; wherein each limb interconnects the fixed lower platform and the movable upper platform by joining the first connecting area and the second connecting area, wherein the lower section of each limb comprises a first part of a first prismatic joint, wherein, the first connecting area comprises a cooperating second part of the first prismatic joint; wherein the lower section of each limb further comprises a first revolute joint; wherein the intermediate section of each limb comprises a second prismatic joint, wherein the upper section of each limb comprises a second revolute joint; wherein each limb is pivotably movable relative to the movable upper platform; wherein each of the limbs comprise an actuation arrangement for moving the movable upper platform relative to the fixed lower platform.

14 Claims, 5 Drawing Sheets

(51) Int. Cl.
*F16M 11/20* (2006.01)
*F16M 11/32* (2006.01)

(56) References Cited

U.S. PATENT DOCUMENTS

| | | |
|---|---|---|
| 2004/0144288 A1 | 7/2004 | Chiang |
| 2010/0122602 A1* | 5/2010 | Marcroft .............. B25J 17/0216 |
| | | 901/18 |
| 2014/0151947 A1* | 6/2014 | Brown ................. B23Q 1/4809 |
| | | 269/58 |
| 2014/0263883 A1 | 9/2014 | Rushworth et al. |
| 2017/0221376 A1* | 8/2017 | Gosselin .............. B25J 17/0216 |
| 2022/0347832 A1* | 11/2022 | Erdem ..................... B25H 1/10 |

FOREIGN PATENT DOCUMENTS

| | | |
|---|---|---|
| EP | 1880702 | 1/2008 |
| KR | 20100124619 | 11/2010 |

* cited by examiner

DEVICE FOR SUPPORTING A LOAD

CROSS-REFERENCE TO RELATED APPLICATIONS

This application is a § 371 national stage entry of International Application No. PCT/SE2020/050939, filed Oct. 5, 2020, which claims priority to Sweden Patent Application No. 1900163-5, filed Oct. 7, 2019, the entire contents of which are incorporated herein by reference.

TECHNICAL FIELD

The disclosure relates to a device for supporting a load comprising a fixed lower platform, a movable upper platform and at least three limbs interconnecting the fixed platform and the movable upper platform.

BACKGROUND

Devices that are used to hold, move, and position a workpiece or an object are useful in several settings such as within manufacturing, machining, or industrial processes. It is used widely in aerospace and defence, automotive, transportation and machine tool technology. Devices used to hold, move and position workpieces and objects require accuracy, robustness and stability, to allow them to hold, move and position workpieces and objects of different sizes and weights without damaging the device or the quality of the task of the device.

It is known in the art to provide devices that perform these operations. Such devices usually have an operating area adapted to hold, move, and position workpieces and objects. Further they usually comprise a plurality of limbs that are pivotably movable in relation to the operating area allowing the device to change position.

Devices within this technical area usually have one or several actuating devices in order for the device to be able to move within different positions and directions. A disadvantage of the prior art is that they may fail to provide satisfactory performance when being under high force or pressure. A further disadvantage of the prior art is that they fail to consistently provide stability to the device while maintaining flexibility.

A previously known device is disclosed in US20140263883A1, which discloses a tool holder mounted to a platform and comprises a plurality of legs extending from respective positions on the platform for connecting the platform to respective positions on the workpiece. Each leg has a first joint system at its platform end. Further, the tool holder is configured to allow free movement of the respective leg. A problem with this disclosure is that the free movement of the legs may hamper the stability of the device.

Thus, even though the prior art fulfills certain requirements related to devices there is still a need for further improvements.

SUMMARY

It is therefore an object of the present disclosure to provide a device which alleviates all or at least part of the drawbacks associated with presently known solutions.

This object is achieved by means of providing a device as defined in the appended claims The present disclosure is at least partly based on the insight that by providing alternating revolute and prismatic joints the device will be more robust.

In accordance with the invention there is provided a device according to claim 1.

The present disclosure provides a machine comprising;
a fixed lower platform having a first connecting area;
a movable upper platform having an operating area and a second connecting area;
at least three limbs, each limb comprising a lower section, an upper section and an intermediate section between said lower section and said upper section; each one of the limbs interconnects said fixed lower platform and said movable upper platform by joining said first connecting area and said second connecting area, the lower section of each limb comprises a first part of a first prismatic joint arranged for movement along a first axis, and the first connecting area comprises a cooperating second part of said first prismatic joint. Further, the lower section of each limb further comprises a first revolute joint arranged for movement around a second axis. The intermediate section of each limb comprises a second prismatic joint extendable along a third axis defined by the axis of extension of the intermediate section of the limb, and the upper section of each limb comprises a second revolute joint for rotation around a fourth axis. Each limb is pivotably movable relative to the movable upper platform and each of the limbs comprise an actuation arrangement for moving the movable upper platform relative to the fixed lower platform. Further, each limb comprises an actuation arrangement for moving the upper platform relative the lower platform. The intermediate section of each limb comprises an upper and lower body, a first support structure extends from the lower section of the limb to the upper body, traversing the lower body. The intermediate section of each limb comprises a second support structure which extends from the upper section to the lower body, traversing the upper body. The actuation arrangement is arranged allowing for slidable motion of the upper body relative the lower body. The actuation arrangement further comprises a device for actuating the actuation arrangement.

A benefit of having a device with four joints, where every other joint is prismatic and every other joint is revolute is that it may allow for more accurate and fast movements from the device. Further, the benefit of having a first prismatic joint that has a first part on the limb and a second cooperating part on the fixed lower platform is that it constraints the limb movement relative to the fixed lower platform which allows for a more robust and stable construction. The upper and lower bodies increase the rigidity and ability of the device to support greater loads on the movable platform.

The movable upper platform may be parallel to said fixed lower platform independently of its position. This also provides the benefit of a more robust and stable construction.

The first part of said first prismatic joint may comprise a bearing carriage. Further the second part of said first prismatic joint may comprise a rail arrangement provided on the first connecting area. Furthermore, the first part of the first prismatic joint may be slidably attached to the rail arrangement, allowing for linear motion along said rail arrangement.

An advantage of having a bearing carriage slidably attached to a rail arrangement is that it allows for a low friction linear slidable movement. Accordingly, this leads to stability of the device while maintaining flexibility in location of the position of the upper platform.

The rail arrangement may comprise at least three straight rail tracks, wherein said rail arrangement may form a polygonal shape, wherein each bearing carriage is slidably attached to a respective rail track.

A benefit of having several rail tracks forming a polygonal shape is that it allows for the first prismatic joint to have a larger motion area. A further advantage is that the device is more stable and robust.

The limbs may have a tapered extension from said fixed lower platform to said movable upper platform. A benefit of this is that it may allow for more stability to pressuring forces on the movable upper platform. Accordingly, there is a less chance that the limbs may be damaged.

The movable upper platform may only have three translational degrees of freedom. An advantage of this is that it allows for flexibility of the device while maintaining stability.

The second prismatic joint may be telescopically extendable. This may allow for the second prismatic joint to extend with low friction.

The second prismatic joint in said intermediate section of each of said at least three limbs may further comprise a lower body and an upper body, wherein a first support structure extend from said lower section to said upper body, traversing said lower body, wherein a second support structure extend from said upper section to said lower body, traversing said upper body, wherein said actuation arrangement is attached to at least a part of one of said upper body or lower body, allowing for a slidable motion. A benefit of having support structures extending in the limb is that they may prevent the limbs from rotating when under pressure and motion. Further, they may increase the stability of the limbs by support the structure. It should be understood that this is just one exemplary embodiment, and that other exemplary embodiments with different configurations of the limbs are conceivable. For instance, the lower body and upper body may, in other exemplary embodiments be omitted. Likewise, the number of support structures extending in the limbs may be adapted as desired, or may be omitted, etc.

One of said first or second support structure may form a part of the actuation arrangement, the actuation arrangement may further comprise a motor for driving said one support structure linearly. A benefit of this is that with the help of one actuation arrangement on each limb, all the prismatic joints may be utilized and the device may operate according to its function.

The second prismatic joint in said intermediate section of each of said at least three limbs may further comprise a lower body and an upper body. Further the actuation arrangement may comprise a shaft, extending from the lower section to at least said upper body. The shaft is linearly guided by a motor in the actuation arrangement, allowing for slidable motion. Accordingly, the shaft of each limb may steer the movement of the movable upper platform in relation to the fixed lower platform. An advantage of having a shaft steering the movements is that it allows for more stability when trying to extend under pressure.

A method for supporting a load is also provided.

Further advantageous embodiments are disclosed in the appended and dependent patent claims.

BRIEF DESCRIPTION OF DRAWINGS

Further objects, features, and advantages of embodiments of the disclosure will appear from the following detailed description, reference being made to the accompanying drawings, in which.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided device and method, it will be apparent to one skilled in the art that the device and method may be realized without these details. In other instances, well known constructions or functions are not described in detail, so as not to obscure the present disclosure.

In the following description of example embodiments, the same reference numerals denote the same or similar components.

The term "prismatic joint" refers to means for providing linear sliding. A prismatic joint may be between two bodies.

The term "revolute joint" refers to means for providing a single-axis rotation function.

Figure 1:
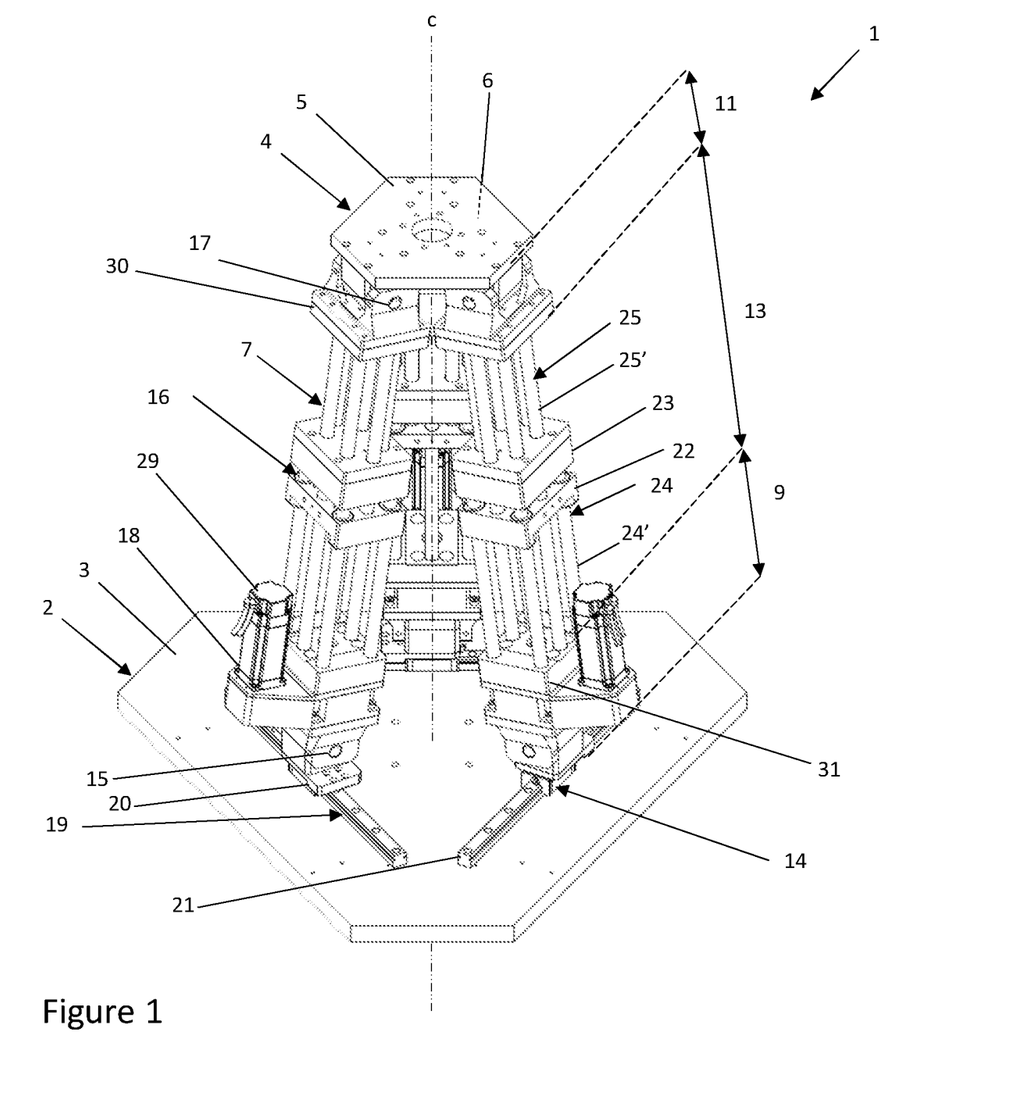
FIG. 1 Depicts a perspective view of at least one exemplary embodiment of the device.

FIG. 1 discloses a device for supporting a load 1 comprising; a fixed lower platform 2 having a first connecting area 3; a movable upper platform 4 having an operating area 5 and a second connecting area 6; at least three limbs 7, each limb 7 comprising a lower section 9, an upper section 11 and an intermediate section 13 between said lower section 9 and said upper section 11; wherein each limb 7 interconnects said fixed lower platform 2 and said movable upper platform 4 by joining said first connecting area 3 and said second connecting area 6, wherein said lower section 9 of each limb 7 comprises a first part of a first prismatic joint 14, wherein, the first connecting area 3 comprises a cooperating second part of said first prismatic joint 14; wherein said lower section 9 of each limb 7 further comprises a first revolute joint 15; wherein said intermediate section 13 of each limb 7 comprises a second prismatic joint 16, wherein said upper section 11 of each limb 7 comprises a second revolute joint 17; wherein each limb 7 is pivotably movable relative to said movable upper platform 4; wherein each of said limbs 7 comprise an actuation arrangement 18 for moving the movable upper platform 4 relative to the fixed lower platform 2. The actuation arrangement 18 may control the movement of the movable upper platform 4 relative to the fixed lower platform 2. The actuation arrangement 18 drives the motion of the device for supporting a load 1.

The load supported by the device 1 is applied to the upper platform 4. The load is generally a compressive load applied to the upper platform 4. The device is arranged upright with the movable upper platform 4 relatively above the fixed lower platform 2. Due to the arrangement of the limbs and joints, the device is especially suitable for supporting heavy loads acting downwards on the upper platform 4.

As disclosed in FIG. 1, the device may comprise two platforms, a fixed lower platform 2 and a movable upper platform 4. The fixed lower platform 2 is configured to be fixed to a basis such as the ground. The movable upper platform 4 is movable in relation to the fixed lower platform 2. As further disclosed in FIG. 1, the movable upper platform 4 comprises an operating area 5. Tools, objects, or other means may be mounted or fixed to the operating area 5 of the movable upper platform 4. The movable upper platform 4 may have a polygonal shape. The fixed lower platform 2, may have a polygonal shape. The movable upper platform 4 and the fixed lower platform 2 may have the same polygonal shape. However, other shapes are also conceivable for the upper and lower platforms 2, 4. The movable upper platform 4 and the fixed lower platform 2 may have a regular convex polygonal shape. As seen in FIG. 1, the device 1 may comprise 2 prismatic joints and 2 revolute joints allowing for the upper movable platform 4 to move in relation to the fixed lower platform 2.

FIG. 1 further discloses that there is a device for supporting a load 1 comprising three limbs 7. The device 1 may have more than three limbs 7, such as four limbs 7, or five limbs 7. Each limb 7 may have a lower section 9 an intermediate section 13 and an upper section 11. As seen in FIG. 1, the upper section 11 may comprise at least a second revolute joint 17, the lower section 9 may comprise at least a first revolute joint 15 and a first part of a first prismatic joint 14. The intermediate section 13 may comprise a second prismatic joint 16 as is disclosed in FIG. 1. The first and the second revolute joint 15, 17 may be the same type of joint, however it may be placed in different positions as seen in FIG. 1. The first and second prismatic joint 14, 16 may differ, in other words the first and second prismatic 14, 16 joint may comprise different type of slide means and different mechanical parts.

The first prismatic joint 14 is arranged for movement along a linear axis. The first prismatic joint is arranged for movement along an axis henceforth defined as the first axis. The axis along which the first prismatic joint is movable is defined by the arrangement of the joint on the fixed lower platform 2.

The first revolute joint 15 is rotatable around an axis. The axis around which the first revolute joint rotates is henceforth defined as the second axis. The second axis is generally parallel to the first axis. As can be seen throughout the figures, the second axis is displaced vertically from the first. The second axis may also be displaced horizontally to the first axis.

The second prismatic joint 16 is movable along a third axis. The third axis is defined by the axis of longitudinal extension of the intermediate section 13. The second prismatic joint 16 enables telescopic extension of the intermediate section 13. The third axis is perpendicular to the first axis.

The second revolute joint 17 is rotatable around a fourth axis. The fourth axis is generally parallel to the second axis. The fourth axis is, as can be seen in the figures, displaced vertically and horizontally from the second axis.

When referring to the term "polygonal shape" as used above, the term means that each of the first prismatic joints 14 of their respective limb 7 has an axis of extension i.e., the first axis, which together forms a convex regular polygon having a number of sides equal to the number of limbs 7 of the device 1. That is, if the device 1 has three limbs 7, then the polygon is a triangle having three sides, the first prismatic joint 14 of each limb 7 defining a side of the triangle. The respective prismatic joints 14 need not actually intersect to form a convex polygon, however, their respective first axes intersect. The arrangement of the axis of the first prismatic joints 14 forming a convex polygon can be seen most easily in FIG. 4, where the three prismatic joints 14 have three respective first axes forming an equilateral triangle on the fixed lower platform 2. If the device were to be provided with four limbs 7 then the first axes of each limb 7 would form a square. The polygonal shape formed by the first prismatic joints 14 of each limb 7 result in a rigid and more stable device 1, than would be the case with a different arrangement of axes.

As further shown in FIG. 1, each of said limbs 7 may comprise an actuation arrangement 18. The actuation arrangement 18 may be connected to the second prismatic joint 16. In other words, the device 1 and the position of the movable upper platform 4 may be controlled through the actuation arrangement 18 positioned on respective second prismatic 16 joint. Thus, the motion of the first prismatic joint 14, the first revolute joint 15, and the second revolute 17 joint may be dependent on the actuation arrangements 18 control of the second prismatic joint 16.

Figure 4:
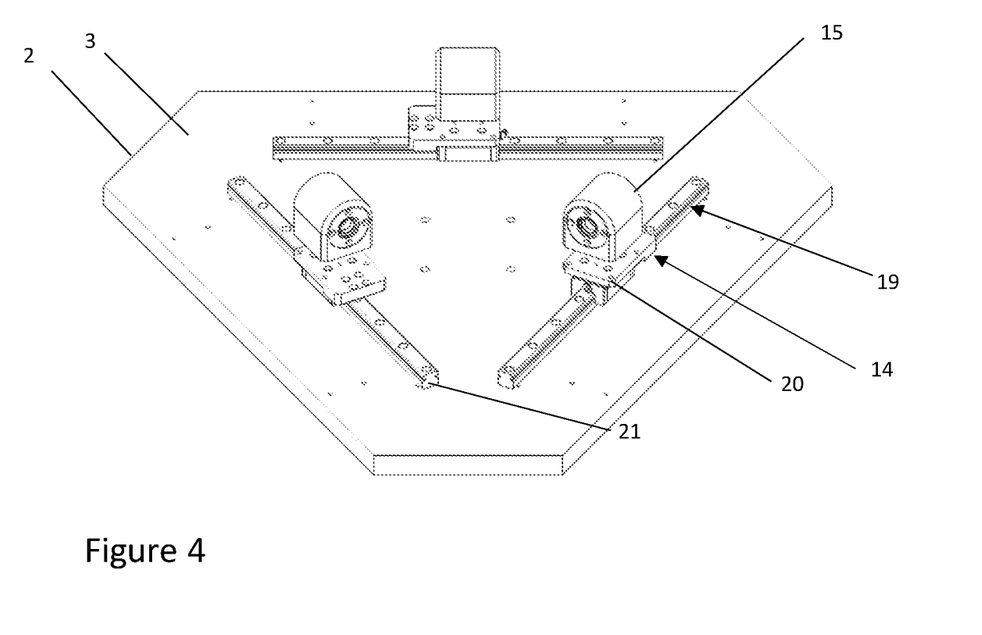
FIG. 4 Depicts a perspective view of a fixed lower platform and a first prismatic joint and a first revolute joint.

As disclosed in FIG. 1 and FIG. 4, the first part of said first prismatic joint 14 may comprise a bearing carriage 20; wherein said second part of said first prismatic joint 14 may comprise; a rail arrangement 19 provided on said first connecting area 3; wherein said first part of said first prismatic joint 14 is slidably attached to the rail arrangement 19, allowing for linear motion along said rail arrangement 19. The rail arrangement 19 may have different profiles, however the bearing carriage 20 is adapted to be slidably mountable on said profile. The bearing carriage 20 may be a sleeve bearing carriage. The rail arrangement 19 constraints the motion of the first prismatic joint 14, allowing for the device 1 to be more robust and stable without losing flexibility and movement. The term "bearing carriage" refers to a device element that constrains relative motion to only the desired direction and reduces friction between moving parts, in other words, it limits an objects motion to a linear motion.

As disclosed in FIG. 1 and FIG. 4 the first revolute joint 15 may be directly attached to the first part of the first prismatic joint 14, in other words the first revolute joint 15 may be directly attached to the bearing carriage 20. However, the first revolute joint 15 may be spaced apart from the first prismatic joins 14. Further as seen in FIG. 1, the second revolute joint 17 may have its attachment point on the second connecting area 6.

The rail arrangement 19 may comprise at least three straight rail tracks 21, wherein said rail arrangement may 19 form a polygonal shape, wherein each bearing carriage 20 is slidably attached to a respective rail track 21. In FIG. 1 and FIG. 4, the rail arrangement 19 comprises 3 straight rail tracks 21, and each rail track 21 has one attached bearing carriage 20. Further, as seen in FIG. 4, the rail tracks 21 may form a triangular shape.

As seen in FIG. 1, said limbs 7 may have a tapered extension from said fixed lower platform 2 to said movable upper platform 4. Further, the device 1, may have a centre axis c extending longitudinally from the central point of the device 1. Accordingly, the upper section 11 of the limbs 7 may have a smaller distance to the centre axis c of the device 1 compared to the lower section 9 of the limbs 7 where the distance to the centre axis c is larger in relation to the upper section 11, thus the limbs 7 may have a tapered extension from the fixed lower platform 2 to the movable upper platform 4 as shown in FIG. 1. The limbs 7 may have a tapered extension independently of the position of the movable upper platform 4.

In other embodiments, the limbs 7 may have a symmetric extension from said fixed lower platform 2 to said movable upper platform 4. In further embodiments the limbs 7 may have a reverse tapered extension from said fixed lower platform 2 to said movable upper platform 4.

The movable upper platform 4 may have three translational degrees of freedom. Hence, independently of the revolute joints 15, 17 of the device 1 it may only move in three translational degrees of freedom. However, the movable upper platform 4 may be coupled with external mechanisms to provide rotational motion.

The movable upper platform 4 may be parallel to said fixed lower platform 2 independently of its position. In other words, the movable upper platform and the fixed lower platform may always be parallel. Independently of motion of the first prismatic joint 14 or the second prismatic joint 16 or the first revolute joint 15 or the second revolute joint 17 they may be parallel, in other words the angle between the movable upper platform 4 and the centre-axis c may at all times be 90 degrees, and the angle between the fixed lower platform 2 and the centre-axis c may at all times be 90 degrees i.e. the centre-axis c may be perpendicular to the movable upper platform 4 and the fixed lower platform 2 at all times.

The second prismatic joint 16 may be telescopically extendable. Accordingly, the limbs 7 may be able to become longer or shorter by having sections that slide inside one another.

Figure 2:
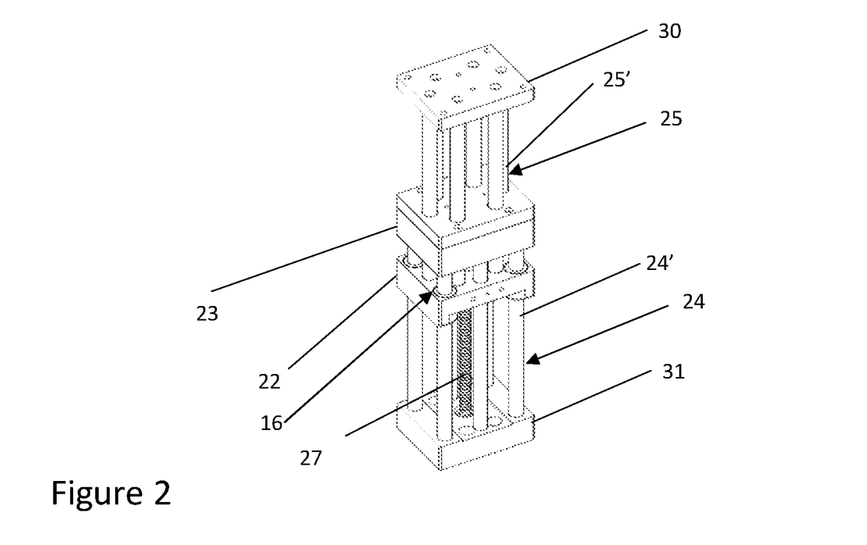
FIG. 2 Depicts a perspective view of a part of a limb, which may be used with the embodiment of FIG. 1.
Figure 3:
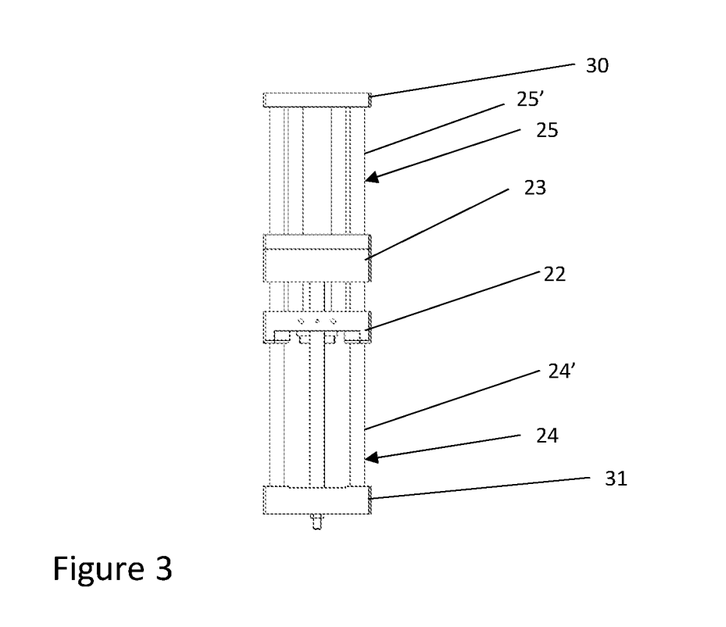
FIG. 3 Depicts a front view of a part of the limb in FIG. 2.

The second prismatic 16 joint in the intermediate section 13 of each of said at least three limbs 7 may further comprise a lower body 22 and an upper body 23, wherein a first support structure 24 extend from said lower section 9 to said upper body 23, traversing said lower body 22, wherein a second support structure 25 extend from said upper section 11 to said lower body 22, traversing said upper body 23, wherein said actuation arrangement 18 is at least partially attached to at least one of said upper body 23 or lower body 22, allowing for a slidable motion. The first support structure 24 may be slidable in relation to said lower body 22 and fixed to said upper body 23. The second support structure 25 may be slidable in relation to said upper body 23 and fixed to said lower body 22. This is further shown in FIG. 1-3, where there is seen that the limbs 7 comprises a lower body 22 and an upper body 23. The closer the lower body 22 is to the upper body 23, the shorter the extension of each limb 7 may be. Accordingly, the longer the distance is between the lower body 22 and the upper body 23, the longer the extension of the limb 7 may be.

As the first support structure 24 traverses the lower body 22 and the second support structure 25 traverses the upper body 23, and the lower and upper bodies 22, 23 move relative to each other to extend the second prismatic joint 16, the second prismatic joint is substantially more rigid than existing prismatic joints. The device can support substantially greater loads, for greater durations, without the upper platform 4 slipping, rotating or otherwise moving. The first and second support structures 24, 25 enable the load which the device 1 supports to be decoupled from the actuation arrangement 18 of the second prismatic joint 16.

The support structures 24, 25 may comprise a plurality of rods 24', 25'. This is reflected in FIG. 1, 2, 3, 5, according to which a first plurality of rods 24' extend from said lower section 9 to said upper body 23, traversing said lower body 22, wherein a second plurality of rods 25' extend from said upper section 11 to said lower body 22, traversing said upper body 23, wherein said actuation arrangement 18 is attached to at least one of said upper body or lower body, allowing for a slidable motion. Further, one of said first or second plurality of rods 24', 25' may form a part of said actuation arrangement 18, said actuation arrangement 18 further comprising a motor 29 for driving said rod 24', 25' linearly. The motor 29 may, for example, be a stepping motor or any other electric motor, or a pneumatic motor, or a hydraulic motor or any other type of suitable motor. The motor 29 may be defined as a device suitable for actuating the actuation arrangement 18.

As seen in FIGS. 1, 2, 3 and 5, the first support structure 24 may comprise 4-8 rods 24' distributed substantially evenly along the cross-sectional area of each limb 7 to provide stability. Further, the second support structure 25 may preferably be between 4-8 rods 25' distributed substantially evenly along the cross-sectional area of each limb 7. Further, the number of rods 24', 25' of the first support structure 24 and the second support structure 25 may be 1-20 rods 24', 25' respectively. The first and second support structures 24, 25 need not be cylindrical rods but could be any suitable rigid longitudinally extending member.

The first support structure 24 may extend from a lower base member 31 to the upper body 23 and the second support structure 25 may extend from an upper base member 30 to the lower body 22. The base members 30, 31 are disclosed in FIG. 2 and FIG. 3 where the lower base member 31 extend from the lower section 13 of the limbs 7 and the upper base member 30 extend from the upper section 11 of the limbs 7. The base members 30, 31 may be flat metal pieces. The first support structure 24 comprises a plurality of rigid members 24' which are fixed at a first end to the lower base member 31, and at a second end to the upper body 23. The second support structure comprises a plurality of rigid members 25' which are fixed at a first end to the lower body 22, and at a second end to the upper base member 30.

Traversing as it is used herein means passing through or by, but not fixed longitudinally with respect to the respective member which is traversed. The first support structure 24 is connected to the lower body 22, but it is not fixed to the lower body 22 and may slide with respect to the lower body 22. The second support structure 25 is connected to the upper body 23, but it is not fixed to the upper body 23 and may slide with respect to the upper body 23. This enables the sliding relative movement as discussed herein, enables the second prismatic joint 16, and maintains torsional rigidity. A torsional force applied to the movable upper platform 4, and acting through a limb 7, is substantially supported by the lower body 22 and the upper body 23. That is, the lower and upper bodies 22, 23 may be subjected to a torque, the torque, however, is not generally transmitted to the actuation arrangement 18. This provides a stronger and more stable platform.

The actuation arrangement 18 may be at least partially attached to the lower body 22, allowing the lower body 22 to be controlled, consequently the upper base member 30 will also be controlled. Accordingly, the lower body 22 may be actuated by the actuation arrangement 18 and further also perform the linear motion in relation to the upper body 23 i.e. the lower body 22 and the upper base member 30 may move and the upper body 23 and the lower base member 31 may be fixed in the longitudinal direction.

One of said first support structure or second support structure 24, 25 may form a part of said actuation arrangement 18. The actuation arrangement 18 may further comprise a motor 29 for driving said support structure linearly. Accordingly, one of the support structures 24, 25 may form a part of the actuation arrangement 18 and the first support structure 24 or the second support structure 25 that doesn't form a part of the actuation arrangement 18 may act as stability means for the limb to add stability and prevent rotation of each limb 7. Hence, the one support structure that forms a part of the actuation arrangement 18 may decide the motion of each limb 7.

Figure 5:
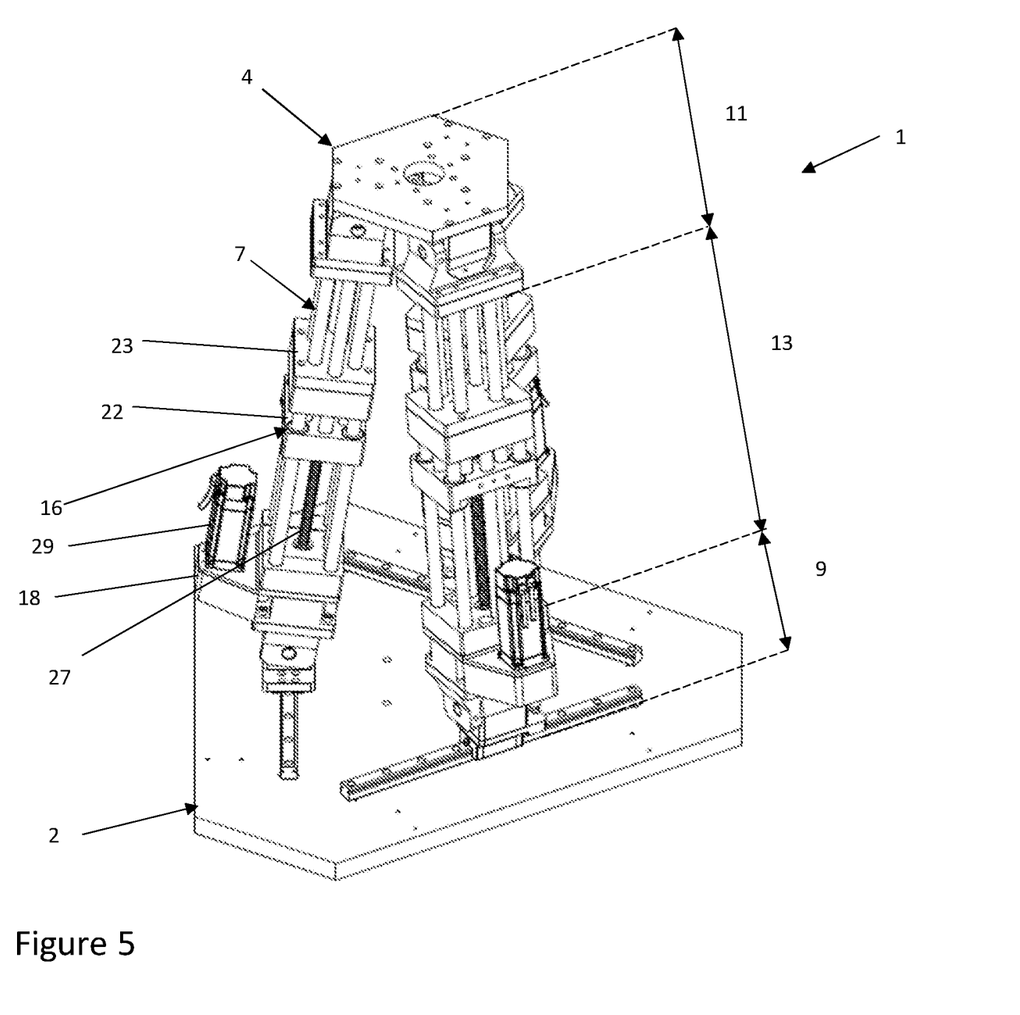
FIG. 5 Depicts another perspective view of the device.

As seen in FIG. 5, the second prismatic joint 16 in said intermediate section 13 of each of said at least three limbs 7 may comprise a lower body 22 and an upper body 23, wherein said actuation arrangement 18 may comprise a shaft 27 and a motor 29, extending from said lower section 9 to at least said upper body 23, said shaft 27 may be guided by said motor 29, allowing for slidable motion of the second prismatic joint 16. The slidable motion may be motion of the lower body 22 in relation to the upper body 23 i.e. the second prismatic joint 16 may be movements of the lower body 22 and the upper body 23 in relation to each other. As disclosed in FIG. 2, the shaft 27 may extend from the lower base member 31 to the upper body 23, traversing the lower body 22. Hence, the shaft 27 that forms a part of the actuation arrangement 18 and may decide the motion of each limb 7. The shaft may be connected to the actuation arrangement 18 by ball screw actuation. Accordingly, the shaft 27 may be threaded so as to provide a helical raceway for ball bearing which act as screws of the shaft 27 to allow it to extend or retract.

Figure 6:
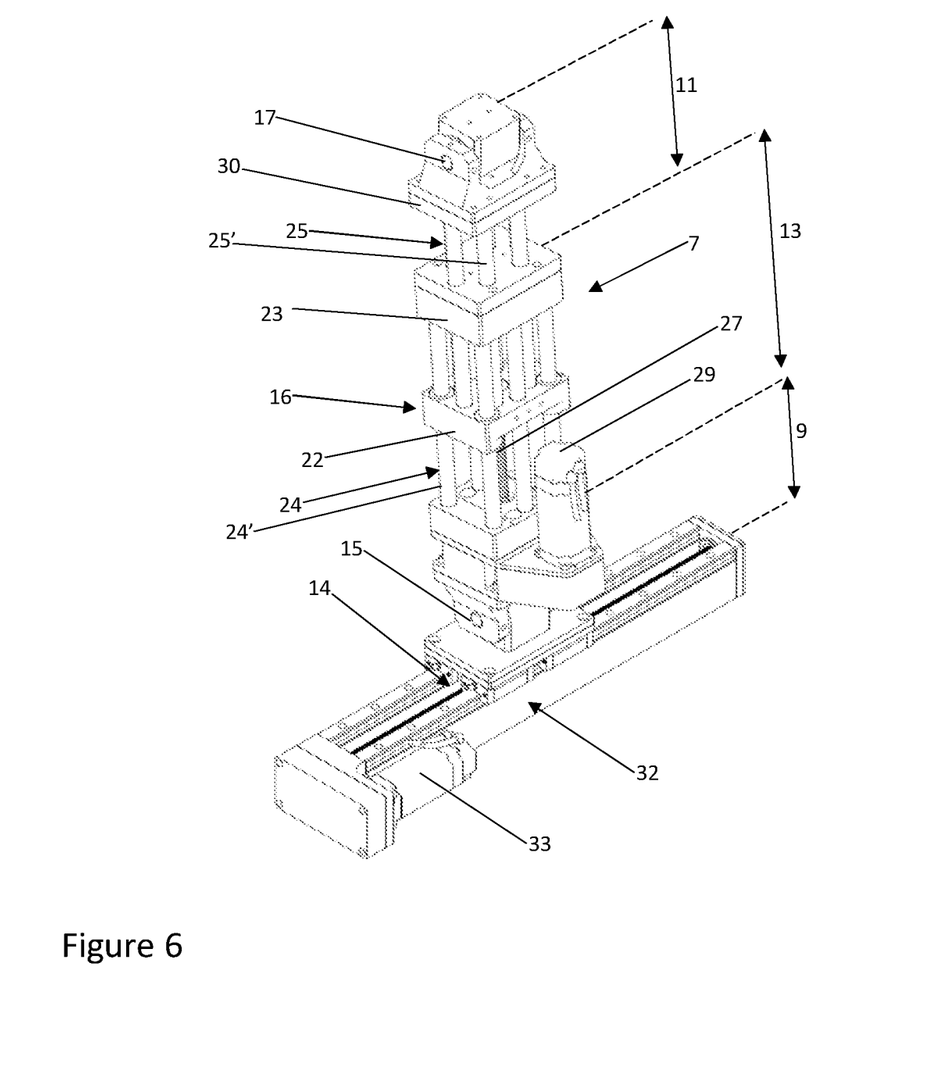
FIG. 6 Depicts a perspective view of a part of a limb which may be used with the embodiment of FIG. 1.

As shown in FIG. 6, the first prismatic joint 14 may be an active prismatic joint 14 where the location of the lower section 9 of each of the limbs 7 along the first prismatic joint 14 is controllable via a second actuation arrangement 32, comprising a device 33 which provides both control to the position, and feedback relating to the position. The device 33 is generally a motor which provides positional control and feedback. The active first prismatic joint 14 enables the position of the upper platform 4 to be controlled with greater precision than if the first prismatic joint is simply a passive sliding rail.

If both the first prismatic joint 14 and the second prismatic joint 16 are provided with actuation arrangements 18, 32 which provide both positional feedback and control as described above then the location of the upper platform 4 can be determined and controlled more efficiently than if only one of the first or second prismatic joints 14, 16 was provided with an actuation arrangement. The kinematics determining the position of the upper platform 4 is more easily solved if the positions of the first prismatic joint 14 and the second prismatic joint 16 are known. The position of the first and second prismatic joints 14, 16 may be transmitted to a device, such as a controller, computer or similar, for calculating the position of the movable upper platform 4. The position of the movable upper platform is determined relative the fixed lower platform 2.

The first revolute joint 15 and the second revolute joint 17 are generally not provided with actuating arrangements. The angle of rotation of each of the first revolute joint 15 and the second revolute joint 17 is determined by the position of the first prismatic joint 14, and the length of the second prismatic joint 16.

There may also be a method for manufacturing a device for supporting a load 1, said method may comprise; providing a fixed lower platform 2 having a first connecting area 3; a movable upper platform 4 having an operating area 5 and a second connecting area 6; at least three limbs 7, each limb 7 comprising a lower section 9 having a lower section 9, an upper section 11 having an upper section 11 and an intermediate section 13 between the lower section 9 and the upper section 11; wherein each limb 7 interconnects said fixed lower platform 2 and said movable upper platform 4 by joining said first connecting area 3 and said second connecting area 6, wherein each limb 7 are pivotably movable relative to said movable upper platform 4, wherein each of said limbs 7 comprise an actuation arrangement 18 for moving the movable upper platform 4 relative to the fixed lower platform 2;
  assembling a first prismatic joint 14 on said lower section 9 of each limb 7
  assembling a first revolute joint 15 on said lower section 9 of each limb 7;
  assembling a second prismatic joint 16, in said intermediate section 13 of each limb 7;
assembling a second revolute joint 17 in said upper section 11 of each of said at least three limbs 7.

A method for supporting a load using the device as described herein comprises applying a load to the movable upper platform 4. The position of the load relative the fixed lower platform 2 may be determined, such as via forward kinematics. The position of the upper platform 4 may be adjusted by displacing the first prismatic joint 14, the second prismatic joint 16 or a combination thereof. The rotation of the first revolute joint 15 and the rotation of the second revolute joint 17 depends on the displacement of the first and/or second prismatic joints 14, 16.

The disclosure has mainly been described above with reference to a few embodiments. However, as is readily appreciated by a person skilled in the art, other embodiments than the ones disclosed above are equally possible within the scope of the invention, as defined by the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:
1. A device for supporting a load comprising;
a fixed lower platform having a first connecting area;
a movable upper platform having an operating area and a second connecting area;
at least three limbs, each limb comprising a lower section, an upper section and an intermediate section between said lower section and said upper section;
wherein each limb interconnects said fixed lower platform and said movable upper platform by joining said first connecting area and said second connecting area,
wherein said lower section of each limb comprises a first part of a first prismatic joint,
wherein, the first connecting area comprises a cooperating second part of said first prismatic joint, wherein the first prismatic joint is arranged for movement along a first axis;
wherein said lower section of each limb further comprises a first revolute joint in attachment with the first part of the first prismatic joint, wherein the first revolute joint is arranged for movement around a second axis, the second axis being parallel to the first axis;
wherein said intermediate section of each limb comprises a second prismatic joint being extendable along a third axis defined by the axis of extension of the intermediate section,
wherein said upper section of each limb comprises a second revolute joint attached to said second connecting area, wherein the second revolute joint is arranged for movement around a fourth axis being parallel to the second axis;
wherein each limb is pivotably movable relative to said movable upper platform;

wherein each of said limbs comprise an actuation arrangement for moving the movable upper platform relative to the fixed lower platform, wherein said second prismatic joint in said intermediate section of each of said at least three limbs further comprises a lower body and an upper body, wherein a first support structure extends from said lower section to said upper body, traversing said lower body, wherein a second support structure extends from said upper section to said lower body, traversing said upper body, wherein said actuation arrangement is attached to at least a part of one of said upper body or lower body, allowing for a slidable relative motion of the upper body to the lower body, and wherein one of said first or second support structures forms a part of said actuation arrangement, said actuation arrangement further comprising a device for driving said one support structure linearly.

2. The device for supporting a load according to claim 1, wherein said first part of said first prismatic joint comprises a bearing carriage;
  wherein said second part of said first prismatic joint comprises;
a rail arrangement provided on said first connecting area;
  wherein said first part of said first prismatic joint is slidably attached to the rail arrangement, allowing for linear motion along said rail arrangement.

3. The device for supporting a load according to claim 1, wherein the first prismatic joint is provided with a second actuation arrangement for controlling the position of the lower section of each limb along the first axis.

4. The device for supporting a load according to claim 1, wherein said rail arrangement comprise at least three straight rail tracks, wherein said rail arrangement form a polygonal shape, wherein each bearing carriage is slidably attached to a respective rail track.

5. The device for supporting a load according to claim 1, wherein said limbs extend from said fixed lower platform to said movable upper platform in a tapered manner, or in a reverse tapered manner or in parallel with each other.

6. The device for supporting a load according to claim 1, wherein said movable upper platform only has three translational degrees of freedom.

7. The device for supporting a load according to claim 1, wherein said second prismatic joint in said intermediate section of each of said at least three limbs further comprises a lower body and an upper body, wherein said actuation arrangement comprises a shaft, extending from said lower section to at least said upper body, said shaft being linearly guided.

8. The device for supporting a load according to claim 1, wherein said movable upper platform is parallel to said fixed lower platform independently of its position.

9. The device for supporting a load according to claim 1, wherein a torsional force applied to the movable upper platform is substantially supported by the lower body and upper body.

10. The device for supporting a load according to claim 1, wherein the position of the first prismatic joint and the second prismatic joint are known and the location of the movable upper platform is determinable via forward kinematics.

11. The device for supporting a load according to claim 1, wherein upper portion of each limb has a smaller distance to a centre axis (C) relative the distance of the lower portion of each limb.

12. A method for supporting a load with the device according to claim 1, wherein the method comprises:
  applying a load to the movable upper platform; and,
  determining the position of the movable upper platform relative the fixed lower platform.

13. The method according to claim 12, wherein the method further comprises:
  adjusting the position of the load via displacing the second prismatic joint.

14. A prismatic joint comprising a lower body and an upper body, wherein a first support structure extends from a lower section of the prismatic joint to the upper body, the first support structure traversing the lower body, wherein a second support structure extends from an upper section of the prismatic joint to the lower body, the second support structure traversing the upper body, wherein the prismatic joint is provided with an actuation arrangement, the actuation arrangement attached to at least a part of one of said upper body or the lower body, and wherein one of the first or second support structures forms a part of said actuation arrangement, the actuation arrangement further comprising a device for driving the support structure linearly.

* * * * *